United States Patent [19]
Chujo et al.

[11] Patent Number: 5,151,937
[45] Date of Patent: Sep. 29, 1992

[54] ADAPTIVE ECHO CANCELLER

[75] Inventors: Kaoru Chujo, Hachiouji; Mitsuo Kakuishi; Hirokazu Fukui, both of Yokohama, all of Japan

[73] Assignee: Fujitsu Limited, Kawasaki, Japan

[21] Appl. No.: 551,485

[22] Filed: Jul. 12, 1990

[30] Foreign Application Priority Data

Jul. 12, 1989 [JP] Japan ................... 1-180984

[51] Int. Cl.$^5$ ............................................. H04M 1/00
[52] U.S. Cl. ....................... 379/410; 379/406; 370/32.1
[58] Field of Search ............. 379/406, 410, 411; 370/32.1

[56] References Cited

U.S. PATENT DOCUMENTS

| | | | |
|---|---|---|---|
| 4,007,341 | 2/1977 | Sourgens et al. | 379/411 |
| 4,283,770 | 8/1981 | Stewart | 379/410 |
| 4,377,793 | 3/1983 | Homa | 379/411 |
| 4,669,116 | 5/1987 | Agazzi et al. | 379/411 |
| 4,731,834 | 3/1988 | Duttweiler et al. | 379/411 |
| 4,823,382 | 4/1989 | Martinez | 379/411 |
| 4,982,428 | 1/1991 | Agazzi et al. | 379/410 |
| 4,995,030 | 2/1991 | Helf | 379/410 |
| 4,999,830 | 3/1991 | Agazzi | 379/406 |
| 5,007,044 | 4/1991 | Miyoshi et al. | 379/411 |
| 5,029,167 | 7/1991 | Arnon et al. | 379/411 |

Primary Examiner—James L. Dwyer
Assistant Examiner—Jhancy Augustus
Attorney, Agent, or Firm—Staas & Halsey

[57] ABSTRACT

An adaptive echo canceller for suppressing an echo in an input signal by a pseudo echo, includes a pseudo echo generation filter having a predicted impulse response sequence of an echo path as filter coefficients thereof for generating a pseudo echo, a coefficient renewal part for adaptively renewing the filter coefficients of the pseudo echo generation filter, and a part for suppressing an echo by the pseudo echo which is generated by the pseudo echo generation filter. The coefficient renewal part includes a part for dividing renewed filter coefficients into a plurality of groups each having a certain number of renewed filter coefficents, and a part for successively selecting one group with a predetermined period and carrying out a correction process with respect to the renewed filter coefficients within the selected group, where the correction process corrects an accumulation of errors of renewal processes.

15 Claims, 7 Drawing Sheets

ADAPTIVE ECHO CANCELLER

BACKGROUND OF THE INVENTION

The present invention generally relates to echo cancellers, and more particularly to an adaptive echo canceller which includes a coefficient renewing circuit for renewing filter coefficients.

For example, an adaptive echo canceller is used to suppress an echo which is generated at a 2-line/4-line converter of a two-line telephone line. In such an adaptive echo canceller, it is desirable to carry out a tap (filter) coefficient renewal process at a high speed and to reduce the scale of the hardware.

In a two-line telephone line communication system, for example, a phenomenon occurs in which a signal received from the other party returns with a transmitting signal from the receiving station at a 2-line/4-line conversion hybrid transformer when making the 2-line/4-line conversion. The echo canceller suppresses such a phenomenon, that is, the echo.

FIG. 1 shows an example of a conventional adaptive echo canceller. The adaptive echo canceller includes a 2-line/4-line conversion hybrid transformer 1, memories 2 and 5, a pseudo echo generation filter 3, a tap coefficient renewal part 4, a subtracting circuit 6, and a doubletalk detector 7.

The memory 2 stores a reception side input signal Rin. The pseudo echo generation filter 3 generates a pseudo echo by a convolution of tap coefficients (impulse response sequence of an echo path) and the received signal. The tap coefficient renewal part 4 adaptively renews tap coefficients of the pseudo echo generation filter 3. The memory 5 stores the tap coefficients obtained from the tap coefficient renewal part 4 and supplies the tap coefficients to the pseudo echo generation filter 3. The subtracting circuit 6 suppresses an echo within a transmission side input signal Sin by the pseudo echo.

An unwanted signal component of a reception side output signal Rout is supplied to the transmission side as the echo. The function of the adaptive echo canceller is to suppress this unwanted signal component by subtracting from a transmission side input signal Sin the pseudo echo which is generated by the convolution of the estimated impulse response of the echo path and the received signal. The magnitude, time delay and the like of the echo depend on the characteristic of the 2-line/4-line conversion hybrid transformer 1, the kind of cable used, the length of cable used and the like. Furthermore, the magnitude, time delay and the like of the echo also change depending on a change in the temperature and humidity. For this reason, the tap coefficients of the pseudo echo generation filter 3 are generally changed adaptively.

For the sake of convenience, the sequence of the reception side input signal Rin is denoted by $X_j$, the sequence of the transmission side input signal Sin is denoted by $Y_j$, the pseudo echo sequence is denoted by $\hat{Y}_j$, and the sequence of a transmission side output signal Sout is denoted by $e_j$. It is assumed that only the echo component is input to the sequence $Y_j$ of the transmission side input signal Sin, and a residual echo is output as the sequence $e_j$ of the transmission side output signal Sout. In the designations used, a subscript j denotes the time. The following formulas (1) through (3) stand when the tap coefficient number (that is, the number of tap coefficients) of the pseudo echo generation filter 3 is denoted by N and an ith tap coefficient at the time j is denoted by $h_i^{(j)}$, where $0 \leq i \leq N$.

$$e_j = Y_j - \hat{Y}_j \tag{1}$$

$$\hat{Y}_j = \sum_{i=0}^{N-1} h_i \cdot X_{j-(N-1-i)} \tag{2}$$

$$h_i^{(j+1)} = h_i^{(j)} + (\alpha e_j \cdot X_{j-(N-1-i)}) / \left( \sum_{i=0}^{N-1} X_{j-(N-1-i)} \right) \tag{3}$$

As described by the formula (2), the pseudo echo $\hat{Y}_j$ is obtained from the convolution of the tap coefficient $h_i$ of the pseudo echo generation filter 3 and the sequence $X_j$ of the reception side input signal Rin. The tap coefficient $h_i$ is renewed according to the formula (3) every time a sampling is made (at each time) for all values of i. The formula (3) is based on an adaptive algorithm called learning identification method which renews the coefficients so that a square of $e_j$ converges to zero for each sample. The learning identification method yields to a relatively satisfactory convergence characteristic and the hardware realization thereof is simple. For this reason, the learning identification method is most popularly used as the adaptive algorithm of the adaptive echo canceller.

Next, a description will be given of the relationship of the formulas (1) through (3) and the scale of the hardware. The formula (1) includes only one subtraction, but the formula (2) includes N multiplication and addition processes. Furthermore, the formula (3) includes N multiplication and addition processes because all N tap coefficients must be renewed. Accordingly, the scale of the hardware increases proportionally to the tap coefficient number N of the pseudo echo generation filter 3.

A relationship between the suppression quantity of the echo canceller and the renewal of the tap coefficients will now be considered for a case where the formula (3) is calculated with a fixed-point. When storing a calculation result of the right term of the formula (3) into the memory 5, it is necessary to adjust the digits by rounding down certain digits by a truncation. But a truncation error E is generated by this truncation, and this truncation error E is generated only in a negative direction. The truncation error E is accumulated to $E \times m$, where m denotes the number of samples. In this case, the tap coefficient is clamped to a negative maximum value and will not converge.

Accordingly, a rounding (rounding off) must be made when renewing the tap coefficient. However, when a narrow band signal is input, the tap coefficient converges differently when compared to the case where other signals are input. Hence, when the rounding is made for each sample, a rounding error is gradually accumulated, and there are problems in that the characteristic of the adaptive echo canceller is greatly deteriorated and a stable operation cannot be carried out. Therefore, in order to ensure a stable operation of the adaptive echo canceller regardless of the kind of signal input, it is necessary to carry out an extremely complex process of making the rounding and sometimes making the truncation.

FIG. 2 shows a conventional circuit part for selectively making the rounding and truncation. The circuit part shown in FIG. 2 includes the tap coefficient renewal part 4, the memory 5 and the doubletalk detector 7 which are connected as shown. The tap coefficient renewal part 4 includes a rounding process part 41, a truncation process part 42, a controller 43, a tap coefficient renewal circuit 44, and switches 45 and 46. Normally, the switches 45 and 46 are connected to the rounding process part 41 under the control of the controller 43. However, the switches 45 and 46 are switched and connected to the truncation process part 42 with a period corresponding to a predetermined number of samples under the control of the controller 43.

In the adaptive echo canceller, the renewal of the tap coefficients must be made within one sampling period for all of the tap coefficients. Suppose that the adaptive echo canceller is realized by a digital signal processor. The digital signal processor is generally provided with a function of truncating the calculated result which is obtained in the tap coefficient renewal part 4 when storing the calculated result into the memory 5, and the time required to carry out this truncation process is short. On the other hand, it takes time to carry out the rounding process by a software process, and a long time is required to carry out the rounding process for all of the tap coefficients. The adaptive echo canceller which has the tap coefficient renewal part 4 shown in FIG. 2 must carry out the rounding process within one sampling period, but when the rounding process cannot be completed within one sampling period, it becomes necessary to use a plurality of digital signal processors and reduce the processing time by a parallel processing. However, the use of the plurality of digital signal processors will increase the scale of the hardware.

Therefore, in order to ensure a stable operation of the adaptive echo canceller with respect to any kind of input signal including a narrow band signal when renewing the tap coefficients of the pseudo echo generation filter 3 by the fixed-point operation, it is essential to switch the process between the rounding and the truncation. However, there are problems in that the switching between the rounding and truncation processes requires a complex control by the controller 43 and the scale of the hardware inevitably increases.

SUMMARY OF THE INVENTION

Accordingly, it is a general object of the present invention to provide a novel and useful adaptive echo canceller in which the problems described above are eliminated.

Another and more specific object of the present invention is to provide an adaptive echo canceller for suppressing an echo in an input signal by a pseudo echo comprising a pseudo echo generation filter having a predicted impulse response sequence of an echo path as filter coefficients thereof for generating a pseudo echo, coefficient renewal means for adaptively renewing the filter coefficients of the pseudo echo generation filter, and means for suppressing an echo by the pseudo echo which is generated by the pseudo echo generation filter. The coefficient renewal means includes means for dividing renewed filter coefficients into a plurality of groups each having a certain number of renewed filter coefficients, and means for successively selecting one group with a predetermined period and carrying out a correction process with respect to the renewed filter coefficients within the selected group, where the correction process corrects an accumulation of errors of renewal processes. According to the adaptive echo canceller of the present invention, it is possible to reduce the time required to carry out the renewal process within the time of one sample, and the scale of the required hardware can be reduced. Furthermore, it is possible to suppress the accumulation of errors caused by the renewal process which is carried out to renew the filter coefficients.

Other objects and further features of the present invention will be apparent from the following detailed description when read in conjunction with the accompanying drawings.

DESCRIPTION OF THE PREFERRED EMBODIMENTS

Figure 3:
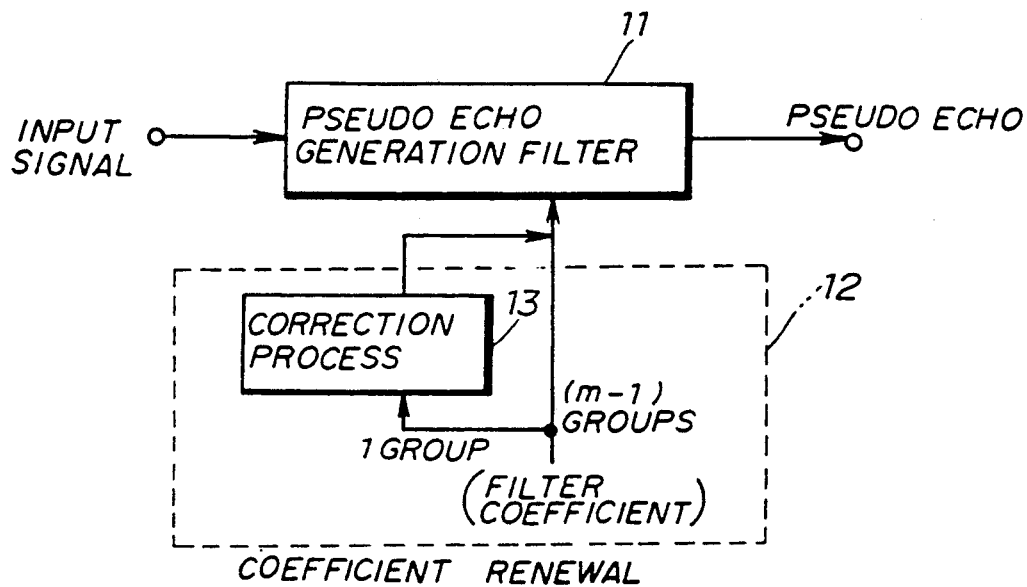
FIG. 3 is a system block diagram for explaining an operating principle of an adaptive echo canceller according to the present invention.

First, a description will be given of an operating principle of an adaptive echo canceller according to the present invention, by referring to FIG. 3. The adaptive echo canceller shown in FIG. 3 includes a pseudo echo generation filter 11, a coefficient renewal circuit 12 and a correction process circuit 13.

The pseudo echo generation filter 11 has the predicted impulse response sequence of the echo path as the filter coefficients. The coefficient renewal circuit 12 adaptively renews the filter coefficients of the pseudo echo generation filter 11. The adaptive echo canceller suppresses the echo by use of the pseudo echo which is generated by the pseudo echo generation filter 11.

The coefficient renewal circuit 12 divides the filter coefficients of the pseudo echo generation filter 11 into m groups, and one group is successively selected from the m groups with a predetermined period. In addition, the accumulated error of the renewal operation process is corrected for the filter coefficients of each selected group.

In the adaptive echo canceller of the present invention, the rounding/truncation process with respect to all of the filter coefficients is not carried out for each sample. A correction process using a unique formula is carried out based on an anticipated value of the accumulation error which occurs by the process such as truncation over m samples, for example. This correction process is carried out at a rate of once per m samples, so as to realize a process which is equivalent to a process which is carried out with respect to the accumulation error for each sample. Therefore, it is possible to reduce the time required to renew the filter coefficients, and in addition, the scale of the hardware can also be reduced.

In other words, the N filter coefficients of the pseudo echo generation filter 11 is divided into m groups each having n filter coefficients, for example. Each group is successively selected at a rate of once per m sampling periods, and with respect to the selected group the correction process circuit 13 carries out the correction process within the time of one sample to cancel the errors accumulated by the renewal process such as truncation over m periods. This correction process is successively carried out for each of the m groups.

Figure 4:
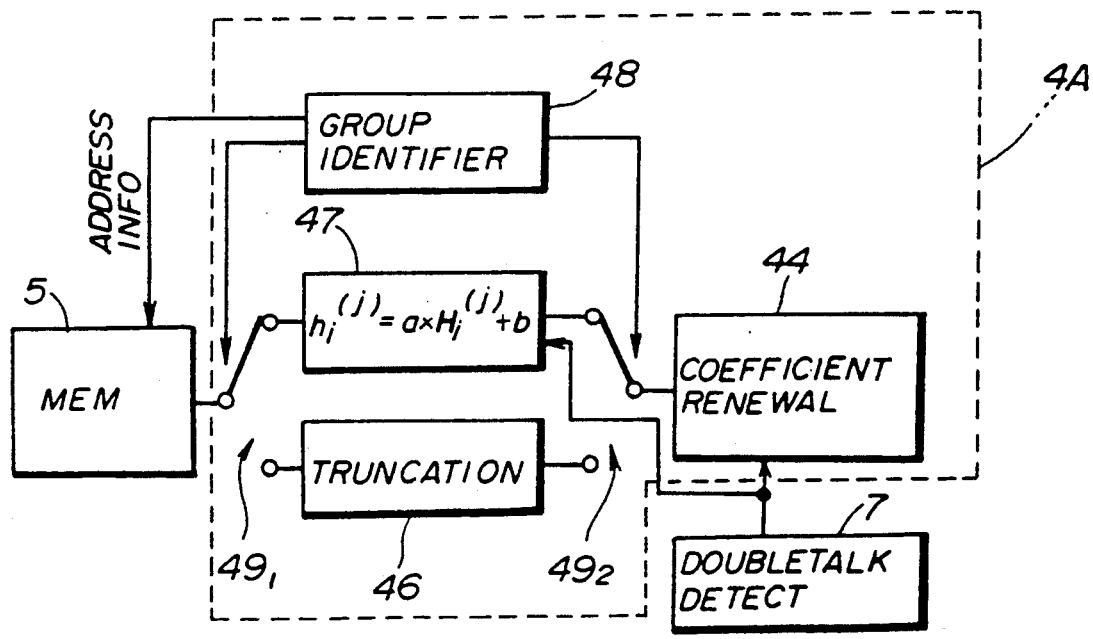
FIG. 4 is a system block diagram showing an essential part of an embodiment of the adaptive echo canceller according to the present invention.

Next, a description will be given of an embodiment of the adaptive echo canceller according to the present invention, by referring to FIG. 4. FIG. 4 shows an essential part of the embodiment. The general structure of the adaptive echo canceller is basically the same as that shown in FIG. 1. In FIG. 4, those parts which are essentially the same as those corresponding parts in FIGS. 1 and 2 are designated by the same reference numerals, and a description thereof will be omitted.

Figure 1:
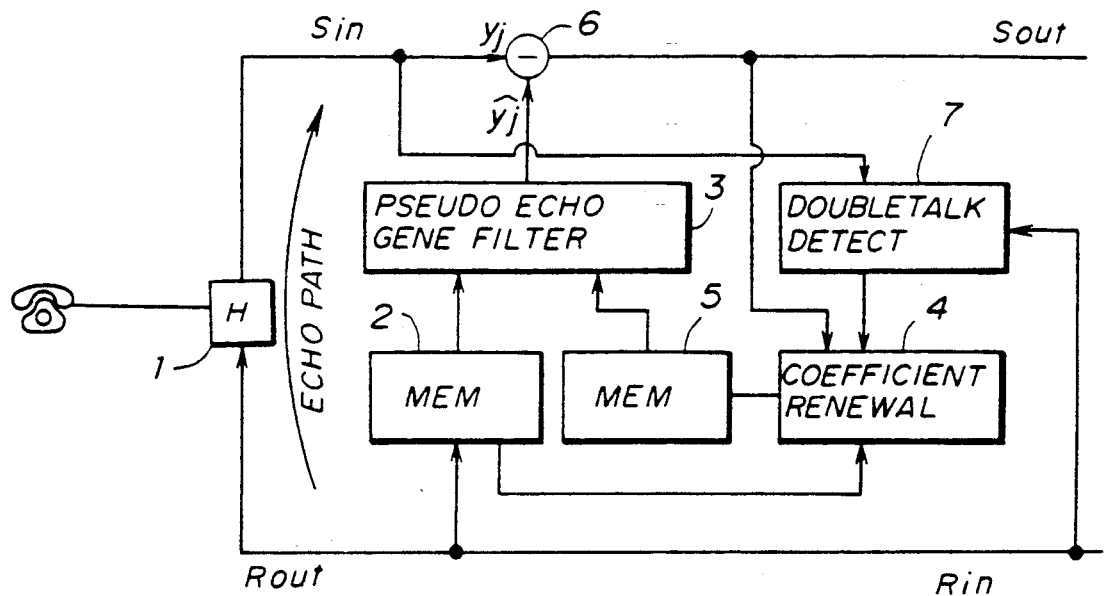
FIG. 1 is a system block diagram showing an example of a conventional adaptive echo canceller.
Figure 2:
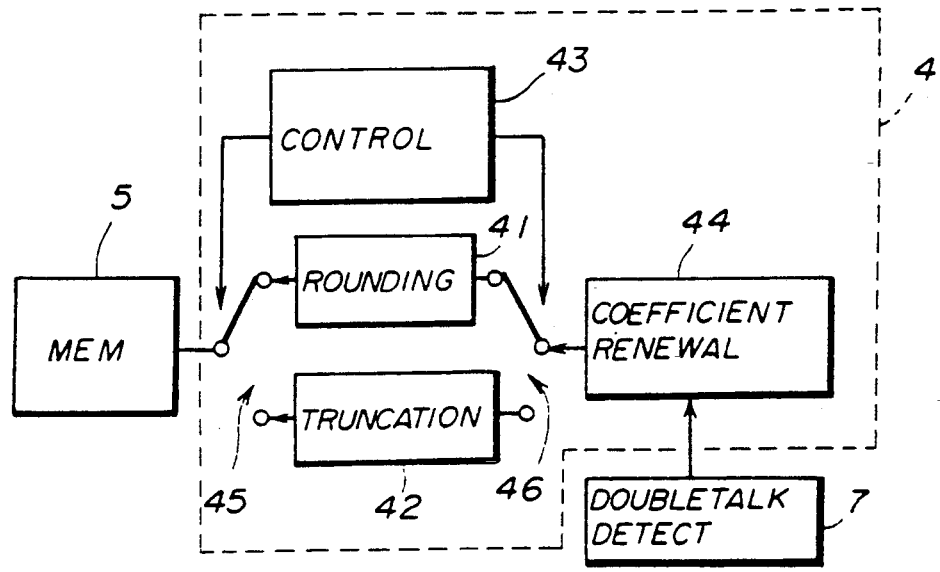
FIG. 2 is a system block diagram showing a conventional circuit part for selectively making a rounding and a truncation.

It is assumed in this embodiment that the adaptive echo canceller is for use with the two-line telephone line, similarly to the conventional adaptive echo canceller shown in FIG. 1. The adaptive echo canceller may be realized by use of a digital signal processor, and the control may be carried out by software or hardware.

In FIG. 4, a tap coefficient renewal part 4A includes the tap coefficient renewal circuit 44, a truncation process part 46, a correction process part 47, a group identifier part 48, and switches $49_1$ and $49_2$.

Figure 5:
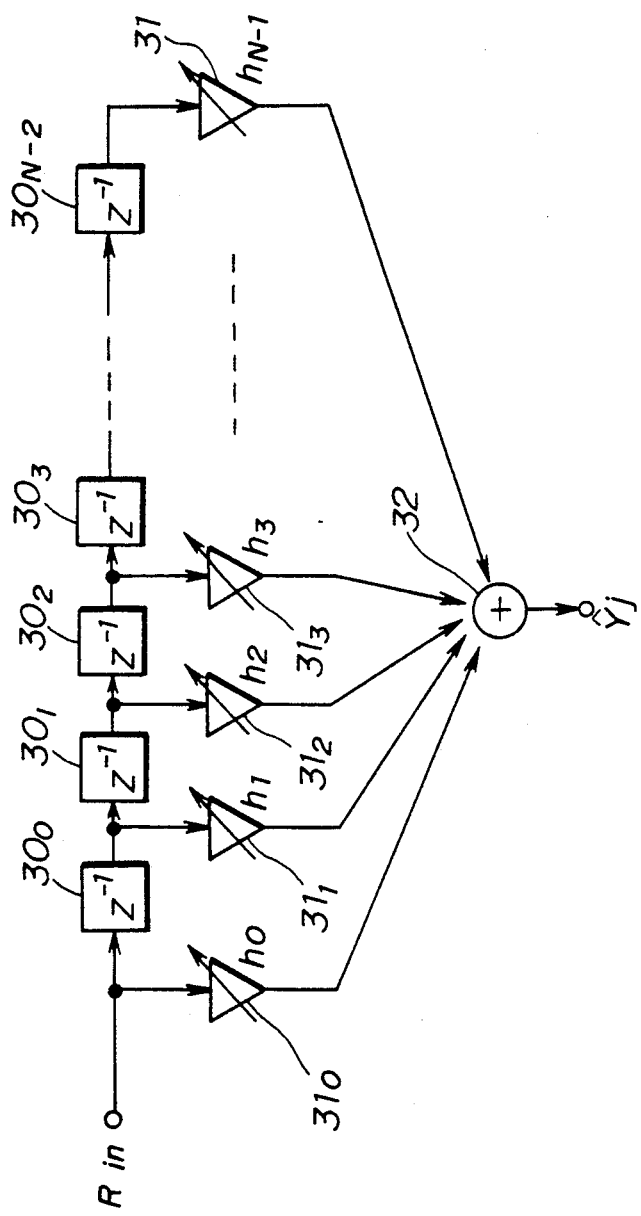
FIG. 5 is a system block diagram showing an embodiment of a pseudo echo generation filter.

FIG. 5 shows an embodiment of the pseudo echo generation filter 3 employed in this embodiment. The pseudo echo generation filter 3 includes N−1 delay circuits $30_0$ through $30_{N-2}$, N multipliers $31_0$ through $31_{N-1}$, and an adder 32 which are connected as shown. The multipliers $31_0$ through $31_{N-1}$ respectively multiply the tap coefficients $h_0$ through $h_{N-1}$ to the signal input thereto. The reception side input signal Rin is supplied to the delay circuit $30_0$ and the multiplier $31_0$. The adder 32 adds outputs of the multipliers $31_0$ through $31_{N-1}$ and outputs the pseudo echo sequence $\hat{Y}_j$.

According to this embodiment, the rounding/truncation process is not carried out for each sample, but an equivalent process is carried out by a unique formula which is based on an anticipated accumulated value of the errors which occur by the truncation. In addition, the N tap coefficients are divided into groups, and the scale of the hardware is reduced by carrying out the above described process only with respect to one group within one sampling period.

Specifically, the N tap coefficients of the pseudo echo generation filter 3 are divided into m groups each having n tap coefficients, where $N = m \times n$. One group is successively selected from the m groups and the correction process is carried out within each sampling period. Accordingly, with regard to one tap coefficient, this one tap coefficient is always subjected to the correction process once per m sampling periods.

Figure 6:
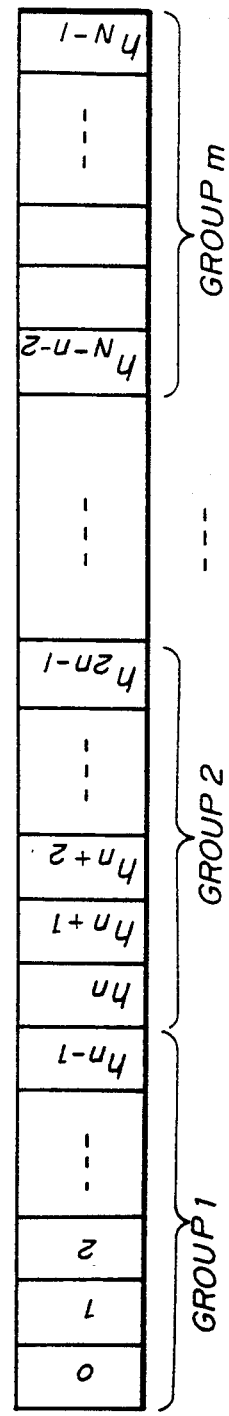
FIG. 6 is a diagram for explaining a storage of tap coefficients in a memory.

First, the tap coefficient renewal part 4A carries out a renewal operation in conformance with the formula (3) for all of the N tap coefficients. The result of the renewal operation is truncated and stored in the memory 5. The renewed tap coefficient which is stored in the memory 5 is denoted by $H_i^{(j)}$. FIG. 6 schematically shows the tap coefficients stored in the memory 5. It is assumed that the result of the renewal operation is not rounded when the result is stored in the memory 5. Thereafter, only one group is selected for each sampling period, and a correction process described by the following formula (4) is carried out with respect to the selected group to obtain the tap coefficient $H_i^{(j)}$ and store the tap coefficient $H_i^{(j)}$ into the memory 5, where $0 < a < 1$ and $0 < b$.

$$h_i^{(j)} = a \times H_i^{(j)} + b \quad (4)$$

In the formula (4), the coefficient a is a positive number slightly smaller than 1 and ensures a stable operation with respect to a narrow band input signal. On the other hand, the coefficient b is a positive number which is calculated based on an anticipated value of the accumulated error caused by the truncation process, and is used for carrying an equivalent of the rounding process. In this embodiment, the correction process described by the formula (4) is carried out only within one sampling period. Hence, when the tap coefficients are divided into m groups, each tap coefficient is subjected to the correction process only once per m samples.

Figure 7:
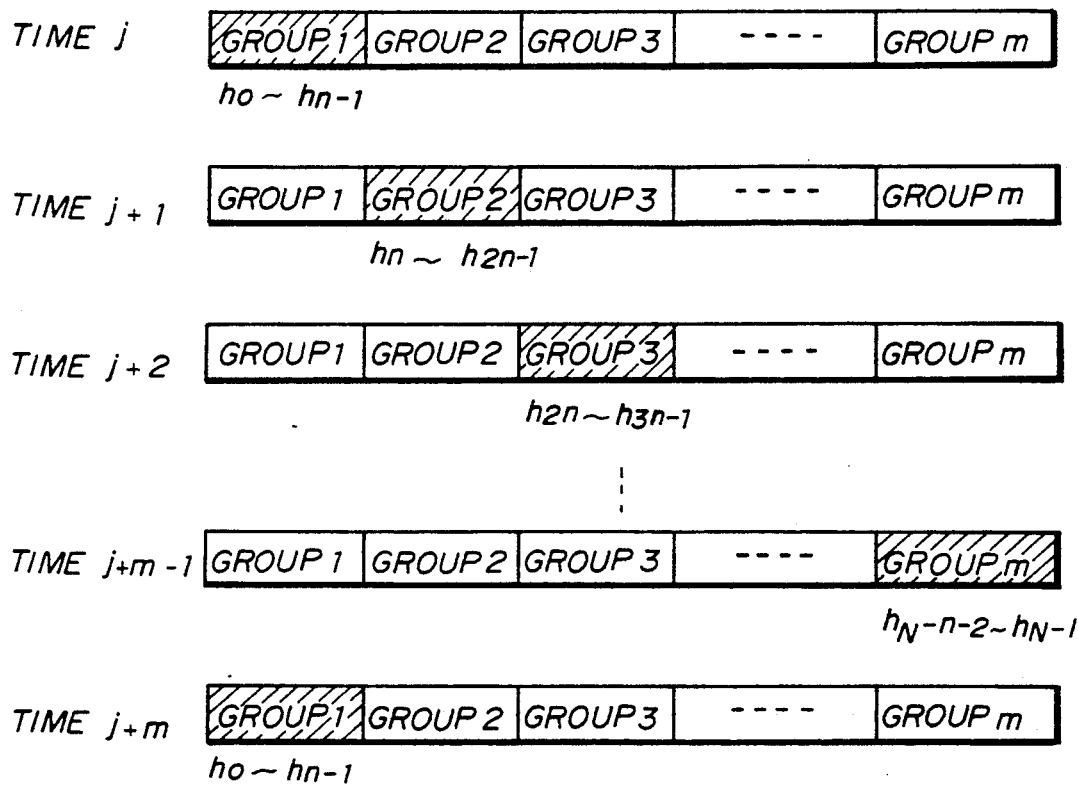
FIG. 7 is a diagram for explaining a correction process.

FIG. 7 is a diagram for explaining the correction process. In FIG. 7, only the tap coefficients indicated by hatchings are subjected to the correction process for each sample.

The tap coefficients to be subjected to the correction process are selected by selectively reading out the tap coefficients from the memory 5 and controlling the switches $49_1$ and $49_2$ by the group identifier part 48. For example, the group identifier part 48 includes a counter (not shown) which counts from 0 to $m-1$. When an output value of the counter is denoted by C, n tap coefficients are read from the memory 5 starting from the $(C \times n)$th tap coefficient for each sampling period. The following Table shows a relationship of the time, the counter output value C and the tap coefficients which are subjected to the correction process.

TABLE

| Time | Output Value C | Tap Coefficients to be Corrected |
|---|---|---|
| j | 0 | $h_{0xn}$ to $h_{0xn+n-1}$ = $h_0$ to $h_{n-1}$ |
| j+1 | 1 | $h_{1xn}$ to $h_{1xn+n-1}$ = $h_n$ to $h_{2n-1}$ |
| . | | |
| . | | |
| j+m−1 | m−1 | $h_{(m-1)n}$ to $h_{N-1}$ |
| j+m | 0 | $h_0$ to $h_{n-1}$ |
| . | | |

Figure 8:
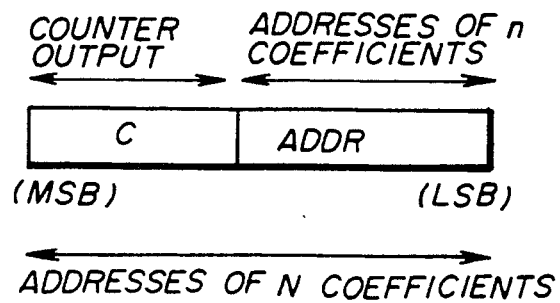
FIG. 8 is a diagram for explaining an operation of a group identifier part.

FIG. 8 is a diagram for explaining the operation of the group identifier part 48. In FIG. 8, an address of the memory 5 is described by the counter output value C and addresses ADDR of n tap coefficients. The most significant bit (MSB) part of the address signal is designated by the counter output value C, so that each group can be identified. The address signal as a whole corresponds to addresses of the N tap coefficients.

When an error which is introduced by one truncation process is denoted by E, this error E is generally −0.5. Accordingly, an anticipated accumulated value of the accumulated error caused by the truncation process during m. Samples can be described by $E \times m = -0.5 \times m$. Thus, in this embodiment, one group is selected from the m groups at the rate of once per m samples in each sampling period, and the correction to cancel the accumulated error is achieved by adding the anticipated value b=m×0.5 to the tap coefficients of the selected group. This correction process is always carried out for each of the m groups at the rate of one per m sampling periods. As a result, it is possible to realize a processing which is equivalent to the conventional rounding process which is carried out with respect to all N tap coefficients for each sample.

The process of adding the anticipated value b of the accumulated error leads to a sufficient suppression characteristic with respect to an input signal other than the narrow band signal. However, since this process is equivalent to the rounding process, it is impossible to carry out a stable operation when the narrow band signal is input. Hence, in this embodiment, the coefficient a which is slightly smaller than 1 is multiplied to the tap coefficient $H_i^{(j)}$ in the formula (4) so that a stable operation is realized with respect to the narrow band signal.

The so-called doubletalk occurs when a far-end speaker and a near-end speaker talk simultaneously. When the doubletalk occurs, the transmission side input signal Sin is added with the echo component and the voice of the near-end speaker. For this reason, the tap coefficients are corrected in a wrong direction when the renewal is continued based on the formula (3). Hence, a process of stopping the renewal of the tap coefficients is generally carried out when the doubletalk is detected, and the correction process of the formula (4) must also be stopped.

Therefore, this embodiment does not require the complex operation of switching between the rounding and truncation processes which is conventionally required to to ensure a stable operation of the adaptive echo canceller with respect to all kinds of input signals including the narrow band signal when renewing the tap coefficients by the fixed-point operation. Instead, this embodiment carries out an equivalent process which requires only simple addition and multiplication described by the formula (4). Furthermore, the number of tap coefficients which are processed within one sampling period is greatly reduced from N to n when compared to the conventional adaptive echo canceller. As a result, the scale of the hardware is reduced, and the operation of renewing the tap coefficients can be carried out at a high speed. In addition, the operation of the adaptive echo canceller is more stable with respect to the narrow band input signal when compared to the conventional adaptive echo canceller.

Figure 9:
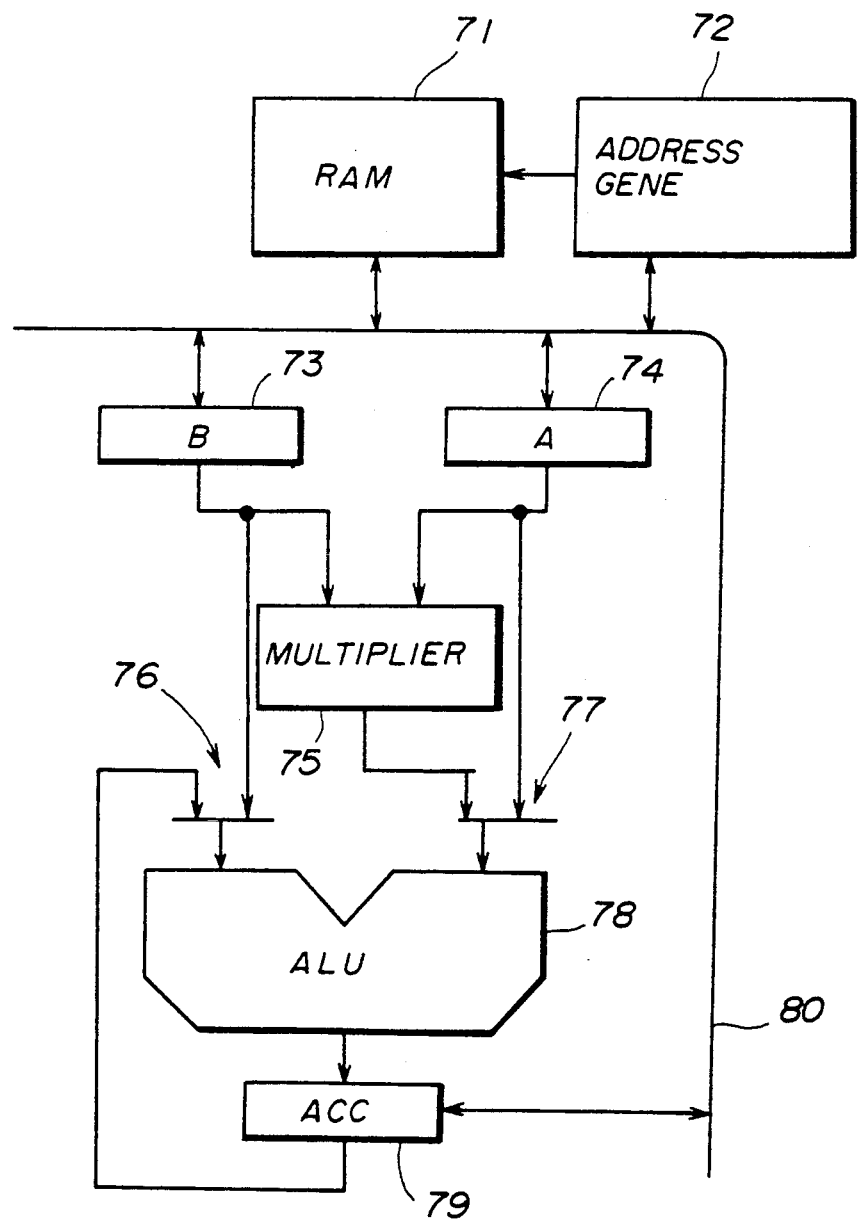
FIG. 9 is a system block diagram showing an embodiment of a digital signal processor for carrying out the operation of the adaptive echo canceller.

As described above, the operation of the adaptive echo canceller can be realized by a digital signal processor. A description will now be given of a case where the operation of the above described embodiment is realized by a digital signal processor shown in FIG. 9. In FIG. 9, the digital signal processor includes a random access memory (RAM) 71, an address generator 72, registers 73, 74 and 79, a multiplier 75, selectors 76 and 77, and an arithmetic logic unit (ALU) 78 which are connected as shown. A data bus 80 couples the RAM 71, the address generator 72, and the registers 73, 74 and 79. The RAM 71 corresponds to the memory 5.

For the sake of convenience, contents of the registers 73 and 74 are respectively denoted by A and B, and a content of the register 79 is denoted by ACC. The ALU 78 can carry out various operations including the following operations.

Figure 10:
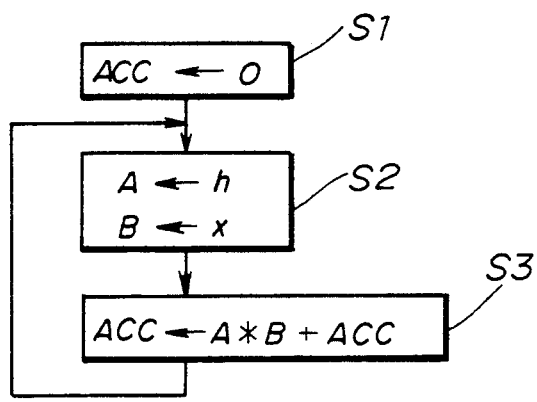
FIGS. 10 and 11 are flow charts for explaining the operation of the digital signal processor.

A+B→ACC
A×B→ACC
B−A→ACC
A×B+ACC→ACC
−A×B+ACC→ACC
ACC+A→ACC
ACC−A→ACC
|ACC|→ACC
Shift bits of data ACC to the right
Shift bits of data ACC to the left
Logic operation on data A including AND and OR Next, a description will be given of an operation of the digital signal processor when carrying out the process described by the formula (2), by referring to FIG. 10. In FIG. 10, a step S1 sets "0 into the register 79 (ACC). A step S2 sets the tap coefficient h into the register 73 (A) and sets the term X of the formula (2) into the register 74 (B). A step S3 carries out an operation A×B+ACC and sets the result of the operation into the register 79 (ACC). The pseudo echo sequence $\hat{Y}_j$ is obtained by repeating the steps S1 through S3 N times.

Figure 11:
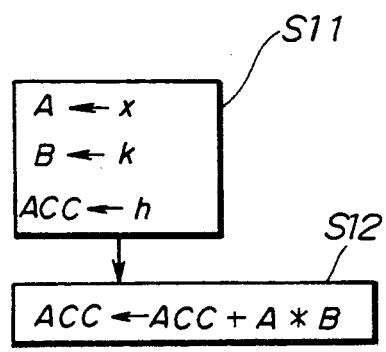
Figure 12:
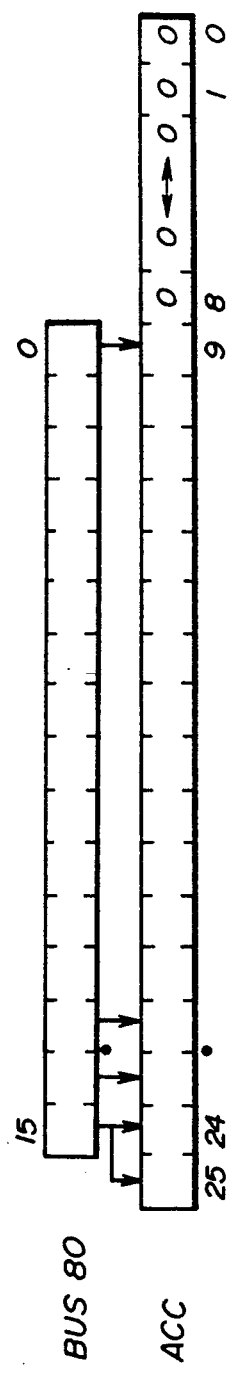
FIGS. 12 and 13 are diagrams for explaining the operation of the digital signal processor.

A description will be given of an operation of the digital signal processor when carrying out the process described by the formula (3), by referring to FIG. 11. In FIG. 11, it is assumed that a term $$K = \left( ae_j / \left( \sum_{i=0}^{N-1} X_{j-(N-1-i)} \right) \right)^2$$

is already calculated. A step S11 sets the term X of the formula (3) into the register 73 (A), the term K into the register 74 (B), and the tap coefficient h into the register 79 (ACC). Then, a step S12 carries out an operation ACC+A×B and sets the result of the operation into the register 79 (ACC). The steps S11 and S12 are carried out for each tap coefficient.

Figure 13:
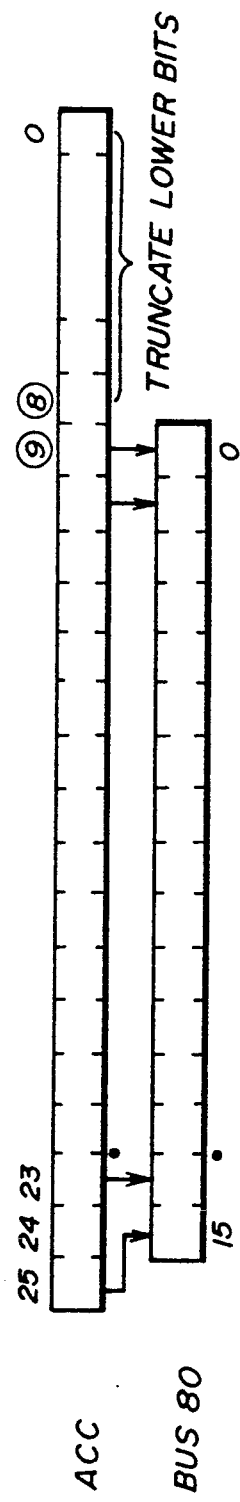

For example, the digital signal processor shown in FIG. 9 is designed to operate with a 16-bit fixed-point, and the register 79 (ACC) has a bit length of 26 bits for storing the result of an operation. The data from the ALU 78 or the data bus 80 is stored in the register 79. When storing the data from the data bus 80 into the register 79, the MSB part of the data is expanded and dummy data "0" is stored in the LSB part of 9 bits. The bit length of the register 79 is greater than those of the data bus 80 and the RAM 71 so that the cumulative operation can be carried out. On the other hand, when outputting the data from the register 79 to the data bus 80 or the RAM 71, the data is rounded to 16 bits as shown in FIG. 13.

In the case of the conventional adaptive echo canceller, it is necessary to carry out the following operation when a process corresponding to the step S12 shown in FIG. 11 is carried out and the renewed tap coefficient h is stored in the register 79. That is, when carrying out the rounding process to make a round off, it is first necessary to check whether or not a bit ⑧ shown in FIG. 13 is "1" and add "1" to a bit ⑨ prior to storing the tap coefficient h into the RAM 71. Such a process must be carried out for all tap coefficients.

However, according to the present invention, such a process required in the conventional adaptive echo canceller is unnecessary. The data processing quantity per sampling period is reduced and constant when compared to the conventional adaptive echo canceller. This is because it is unnecessary to make a judgement to determine whether the truncation is to be made or the rounding is to be made.

Further, the present invention is not limited to these embodiments, but various variations and modifications may be made without departing from the scope of the present invention.

What is claimed is:

1. An adaptive echo canceller for suppressing an echo in an input signal by a pseudo echo, said adaptive echo canceller comprising:
   a pseudo echo generation filter having a predicted impulse response sequence of an echo path as filter coefficients thereof for generating a pseudo echo;
   coefficient renewal means for adaptively renewing the filter coefficients of said pseudo echo generation filter to produce renewed filter coefficients, said coefficient renewal means including
   means for dividing the renewed filter coefficients into a plurality of groups each having a certain number of renewed filter coefficients, and
   means for successively selecting one group with a predetermined period and carrying to a correction process with respect to the renewed filter coefficients within the selected group, the correction process correcting an accumulation of errors of renewal processes; and
   means for suppressing an echo by the pseudo echo generated by said pseudo echo generation filter.

2. The adaptive echo canceller as claimed in claim 1, wherein said adaptive echo canceller further comprises doubletalk detector means for detecting a doubletalk condition, and
   wherein said coefficient renewal means further includes means for stoping the renewal of the filter coefficients and the correction process when said double talk detector means detects the doubletalk condition.

3. The adaptive echo canceller as claimed in claim 1, wherein said adaptive echo canceller further comprises memory means, and
   wherein said coefficient renewal means further includes
   correction means for carrying out the correction process,
   truncating means for truncating the renewed filter coefficients, said memory means storing outputs of said correction means and said truncating means,
   switching means for selectively connecting one of said correction means and said truncating means to said memory means at one time, and
   control means for controlling a switching operation of said switching means, said coefficient renewal means truncating each renewed filter coefficient in said truncation means to produce a truncated renewed filter coefficient and then performing the correction process on the truncated renewed filter coefficient in said correction means once every m sampling periods.

4. The adaptive echo canceller as claimed in claim 1, wherein said pseudo echo generation filter has N filter coefficients, and
   wherein said coefficient renewal means divides the N renewed filter coefficients into m groups, each group having n renewed filter coefficients, such that $N = m \times n$.

5. The adaptive echo canceller as claimed in claim 4, wherein said coefficient renewal means subjects each renewed filter coefficient to the correction process once every m sampling periods regardless of the group to which each renewed filter coefficient belongs.

6. The adaptive echo canceller as claimed in claim 1 applied to a two-line telephone line communication system which is coupled to a 2-line/4-line converter which is included in said echo path, wherein said coefficient renewal means renews the filter coefficients according to a predetermined formula and obtains the renewed filter coefficients by truncating results obtained from said predetermined formula, where said predetermined formula is given by $$h_i^{(j+1)} = h_i^{(j)} + (\alpha e_j \cdot X_{j-(N-1-i)}) / \left( \sum_{i=0}^{N-1} X_{j-(N-1-i)} \right)^2$$

where a sequence of a reception side input signal Rin is denoted by $X_j$, a sequence of a transmission side input signal Sin is denoted by $Y_j$, a pseudo echo sequence is denoted by $\hat{Y}_j$, a sequence of a transmission side output signal Sout is denoted by $e_j$, a learning identification method coefficient is denoted by $\alpha$, only an echo component is input to the sequence $Y_j$ of the transmission side input signal Sin, a residual echo is output as the sequence $e_j$ of the transmission side output signal Sout, a subscript j denotes time, a number of filter coefficients of the pseudo echo generation filter is denoted by N, an ith filter coefficient at the time j is denoted by $h_i^{(j)}$, $0 \leq i \leq N$ and $$e_j = Y_j - \hat{Y}_j$$

$$\hat{Y}_j = \sum_{i=0}^{N-1} h_i \cdot X_{j-(N-1-i)}.$$

7. The adaptive echo cancelling filter as claimed in claim 6 wherein said correction process is described by a formula $$h_i^{(j)} = a \times H_i^{(j)} + b$$

where the renewed filter coefficient which is obtained by truncating the result obtained from said predetermined formula is denoted by $H_i^{(j)}$, $0 < a < 1$ and $0 < b$.

8. The adaptive echo canceller as claimed in claim 7, wherein said pseudo echo generation filter has N filter coefficients,
   wherein said coefficient renewal means divides the N renewed filter coefficients into m groups, each group having n renewed filter coefficients such that $N = m \times n$, and
   wherein said correction process is carried out at a rate of once every sampling period of the m sampling periods.

9. The adaptive echo canceller as claimed in claim 7 wherein b is a coefficient described by $b = E \times m$, where E denotes an error which occurs in one truncation process.

10. A method of adaptive echo cancellation, said method comprising the steps of:
   (a) suppressing an echo in an input signal by a pseudo echo;
   (b) generating the pseudo echo for said suppressing in step (a) based on filter coefficients; and (c) periodically renewing the filter coefficients used to generate the pseudo echo in step (b), wherein said renewing in step (c) includes at least the steps of:
- (c1) selecting filter coefficients for renewal; and
- (c2) correcting an accumulation of errors with respect to the filter coefficients selected for renewal in step (c1).

11. A method according to claim 10, wherein said correcting in step (c2) corrects an accumulation of errors based on an anticipated accumulated value of the errors which would occur by truncation.

12. A method according to claim 10, wherein said selecting in step (c1) selects one of a plurality of groups of filter coefficients.

13. A method according to claim 12, wherein said selecting in step (c1) selects one of m groups of filter coefficients having n filter coefficients per group among a total of $N = m \times n$ filter coefficients.

14. A method according to claim 13, wherein said selecting in step (c1) successively selects the groups of filter coefficients so that each of the N filter coefficients is selected every m times step (c1) is performed.

15. An adaptive echo canceller for suppressing an echo in an input signal by a pseudo echo, said adaptive echo canceller comprising:
- a pseudo echo generation filter having N filter coefficients for providing a predicted impulse response sequence of an echo path to generate a pseudo echo;
- coefficient renewal means for adaptively renewing the filter coefficients of said pseudo echo generation filter to produce renewed filter coefficients, said coefficient renewal means including
- means for dividing the renewed filter coefficients into m groups, each group having n renewed filter coefficient, such that $N = m \times n$, and
- means for successively selecting one group with a predetermined period and carrying out a correction process with respect to the renewed filter coefficients within the selected group, the correction process correcting an accumulation of errors of renewal processes and occurring once every m sampling periods regardless of the group to which each renewed filter coefficient belongs; and
- means for suppressing an echo by the pseudo echo generated by said pseudo echo generation filter.

* * * * *

UNITED STATES PATENT AND TRADEMARK OFFICE
CERTIFICATE OF CORRECTION

PATENT NO. : 5,151,937
DATED : Kaoru Chujo et al.
INVENTOR(S) : September 29, 1992

It is certified that error appears in the above-identified patent and that said Letters Patent is hereby corrected as shown below:

Col. 1, line 60, "Yj" should be --$\hat{Y}j$--.

Col. 6, line 67, "m. Samples" should be --m samples--.

Col. 9, line 23, "to" should be --out--.

Col. 9, line 35, "stoping" should be --stopping--.

Col. 9, line 37, "double talk" should --doubletalk--.

Col. 12, lines 13 and 14, "coefficient" should be --coefficients--.

Signed and Sealed this

Twenty-sixth Day of October, 1993

Attest:

BRUCE LEHMAN

*Attesting Officer*     *Commissioner of Patents and Trademarks*